US006587510B1

(12) United States Patent
Minami et al.

(10) Patent No.: US 6,587,510 B1
(45) Date of Patent: Jul. 1, 2003

(54) CONTROL INFORMATION TRANSMITTING METHOD, TRANSMITTER, AND TRANSMITTING AND RECEIVING APPARATUS

(75) Inventors: Hideki Minami, Chiba (JP); Tomoya Yamaura, Tokyo (JP); Kazuyuki Sakoda, Tokyo (JP); Mitsuhiro Suzuki, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/204,295

(22) Filed: Dec. 3, 1998

(30) Foreign Application Priority Data

Dec. 10, 1997 (JP) .......................................... 9-340389

(51) Int. Cl.[7] .............................................. H04B 15/00
(52) U.S. Cl. ....................................... 375/285; 455/522
(58) Field of Search ................................ 370/318, 252, 370/320, 284, 285, 296, 299; 375/347, 227, 130

(56) References Cited

U.S. PATENT DOCUMENTS 5,537,430 A 7/1996 Park et al. .................... 371/43
5,832,044 A * 11/1998 Sousa et al. ................ 375/347
5,878,329 A * 3/1999 Mallinckrodt ................ 455/69
6,108,374 A * 8/2000 Balachandran et al. ..... 375/227
6,208,873 B1 * 3/2001 Black et al. ................ 455/126

FOREIGN PATENT DOCUMENTS

EP 0682417 12/1995 ........... H04B/7/005

OTHER PUBLICATIONS

IS–95 Standard (not included, see USP 6,208,873), May 1995.*

Raymond, Steele, "Mobile Radio Communications", 1994, IEEE Press ISBN 0–7803–1102–7, Piscataway, NJ 08855 XP002208096, pp. 549, line 1–pp. 552, line 22.

* cited by examiner

*Primary Examiner*—Stephen Chin
*Assistant Examiner*—Kevin Kim
(74) *Attorney, Agent, or Firm*—Jay H. Maioli

(57) ABSTRACT

A control information transmitting method for controlling transmission power, wherein a control symbol obtained by assigning control information for controlling transmission power to symbols of phase modulation is transmitted to a communication partner so as to control the transmission power of the communication partner, the control information which represents raising the transmission power of communication partner and the control information which represents lowering the transmission power of the communication partner are assigned to a pair of symbols having the longest Euclidian distance among the symbols of phase modulation. Whereby, even if receiving noise or interference are present during transmission, the control information can be prevented from being misjudged because the distance on the signal constellation is farthest apart from each other, so that the control information can be transmitted exactly.

25 Claims, 9 Drawing Sheets

1

4 RECEIVING SECTION
5 CONTROL SECTION
6 TRANSMITTING SECTION
2

7 RECEIVING SECTION
8 CONTROL SECTION
9 TRANSMITTING SECTION
3

| | JUDGED RESULT OF CONTROL DATA IN PREVIOUS BURST | JUDGED RESULT OF CONTROL DATA IN CURRENT BURST | TRANSMISSION POWER CONTROL |
|---|---|---|---|
| A | Up | Up→Hold | Hold |
| B | Up | Down/Hold→Hold | 2dB Down |
| C | Up | Up | Up |
| D | Up | Down | Down |
| E | Down | Up→Hold | 2dB Up |
| F | Down | Down/Hold→Hold | Hold |
| G | Down | Up | Up |
| H | Down | Down | Down |
| I | Up→Hold | Up→Hold | 1dB Up |
| J | Up→Hold | Down/Hold→Hold | Hold |
| K | Up→Hold | Up | Up |
| L | Up→Hold | Down | Down |
| M | Down/Hold→Hold | Up→Hold | 1dB Up |
| N | Down/Hold→Hold | Down/Hold→Hold | Hold |
| O | Down/Hold→Hold | Up | Up |
| P | Down/Hold→Hold | Down | Down |

Down ------ DOWN COMMAND
Up ------ UP COMMAND
Up→Hold ------ UP HOLD COMMAND
Down/Hold→Hold ------ DOWN HOLD COMMAND

FIG. 5

| | JUDGED RESULT OF CONTROL DATA IN PREVIOUS BURST | JUDGED RESULT OF CONTROL DATA IN CURRENT BURST | C/I RATIO | TRANSMISSION POWER CONTROL |
|---|---|---|---|---|
| A | Up | Up→Hold | PREVIOUS>CURRENT | Hold |
| B | Up | Up→Hold | PREVIOUS<CURRENT | Hold |
| C | Up | Down/Hold→Hold | PREVIOUS>CURRENT | Hold |
| D | Up | Down/Hold→Hold | PREVIOUS<CURRENT | 2dB Down |
| E | Up | Up | PREVIOUS>CURRENT | Up |
| F | Up | Up | PREVIOUS<CURRENT | Up |
| G | Up | Down | PREVIOUS>CURRENT | Down |
| H | Up | Down | PREVIOUS<CURRENT | Down |
| I | Down | Up→Hold | PREVIOUS<CURRENT | 2dB Up |
| J | Down | Up→Hold | PREVIOUS>CURRENT | Hold |
| K | Down | Down/Hold→Hold | PREVIOUS>CURRENT | Hold |
| L | Down | Down/Hold→Hold | PREVIOUS<CURRENT | Hold |
| M | Down | Up | PREVIOUS>CURRENT | Up |
| N | Down | Up | PREVIOUS<CURRENT | Up |
| O | Down | Down | PREVIOUS>CURRENT | Down |
| P | Down | Down | PREVIOUS<CURRENT | Down |
| Q | Up→Hold | Up→Hold | PREVIOUS<CURRENT | 1dB Up |
| R | Up→Hold | Up→Hold | PREVIOUS>CURRENT | Hold |
| S | Up→Hold | Down/Hold→Hold | PREVIOUS>CURRENT | Hold |
| T | Up→Hold | Down/Hold→Hold | PREVIOUS<CURRENT | Hold |
| U | Up→Hold | Up | PREVIOUS>CURRENT | Up |
| V | Up→Hold | Up | PREVIOUS<CURRENT | Up |
| W | Up→Hold | Down | PREVIOUS>CURRENT | Down |
| X | Up→Hold | Down | PREVIOUS<CURRENT | Down |
| Y | Down/Hold→Hold | Up→Hold | PREVIOUS<CURRENT | 1dB Up |
| Z | Down/Hold→Hold | Up→Hold | PREVIOUS>CURRENT | Hold |
| a | Down/Hold→Hold | Down/Hold→Hold | PREVIOUS>CURRENT | Hold |
| b | Down/Hold→Hold | Down/Hold→Hold | PREVIOUS<CURRENT | Hold |
| c | Down/Hold→Hold | Up | PREVIOUS>CURRENT | Up |
| d | Down/Hold→Hold | Up | PREVIOUS<CURRENT | Up |
| e | Down/Hold→Hold | Down | PREVIOUS>CURRENT | Down |
| f | Down/Hold→Hold | Down | PREVIOUS<CURRENT | Down |

FIG. 7

CONTROL INFORMATION TRANSMITTING METHOD, TRANSMITTER, AND TRANSMITTING AND RECEIVING APPARATUS

BACKGROUND OF THE INVENTION

1. Field of the Invention

This invention relates to a control information transmitting method, a transmitter, and a transmitting and receiving apparatus, and more particularly, is applicable to a cellular wireless communication system.

2. Description of the Related Art

In the cellular wireless communication systems, areas for providing communication service are segmented into cells having a desired size to set a base station as a fixed station in the cell. A communication terminal device provided as a mobile station wirelessly communicates with the base station which is in the most preferable state for communication.

In this type of cellular wireless communication system, there is a case where high transmission power is needed to communicate or there is a case where low transmission power can communicate sufficiently, depending on the location of the mobile station. In the cellular wireless communication system, the base station and the communication terminal device check the reception power (or the quality of reception signal) between each other and inform each other of the checked result to form a feedback loop, so that communication under minimum transmission power, so-called transmission power control, is performed. Thereby, the cellular wireless communication system can efficiently communicate under minimum transmission power and reduce power consumption comparing to the case of communicating under constant power, so that the communication terminal device obtains the especial effect that battery life can be extended.

In the conventional cellular wireless communication system, control information for power control is transmitted to a communication partner to control the transmission power. However, no measures have been taken to transmit the control information exactly, and it is necessary to be improved.

SUMMARY OF THE INVENTION

In view of the foregoing, an object of this invention is to provide a control information transmitting method which can transmit the control information for controlling transmission power exactly and a transmitter and a transmitting and receiving apparatus which use the method.

The foregoing object and other objects of the invention have been achieved by the provision of a control information transmitting method and a transmitter and a transmitting and receiving apparatus.

In a control information transmitting method of transmitting, to a communication partner, control symbols obtained by assigning control information for controlling transmission power to symbols of phase modulation, so as to control the transmission power of the communication partner, the control information which indicates raising the transmission power of the communication partner and the control information which indicates lowering the transmission power of the communication partner are assigned to a pair of symbols having the longest Euclidian distance between the symbols from among the symbols of phase modulation.

Further, the control information transmitting method uses control information which indicates raising the transmission power of the communication partner, control information which indicates lowering the transmission power of the communication partner, and control information which includes the contents of the control information previously sent to the communication partner and which indicates holding the transmission power of the communication partner, as the control information, so as to transmit to the communication partner the control symbols to which one of the control information is assigned.

Further, the control information transmitting method uses a plurality of rectangular subcarriers to communicate with the communication partner, and assigns the control symbols to the subcarriers, excluding the vicinity of both ends and center of the band, from among plurality of the subcarriers and then transmits them.

Further, in the control information transmitting method, using "n" band slots comprising a plurality of rectangular subcarriers for communication with the communication partner, "k" subcarriers for transmitting control symbols are respectively provided in the band slots (where, $n \geqq k$) from among the "n" band slots and then the control symbols are assigned one by one to the subcarriers for transmitting the control symbols to be transmitted.

Furthermore, a transmitter for transmitting to a communication partner control symbols obtained by assigning control information for controlling transmission power to symbols of phase modulation, so as to control the transmission power of the communication partner, comprises a symbol producing means for producing the control symbols by assigning the control information which indicates raising the transmission power of the communication partner and the control information which indicates lowering the transmission power of the communication partner to a pair of symbols having the longest Euclidian distance between the symbols from among the symbols of phase modulation, and a transmitting means for transmitting the control symbols to the communication partner.

Further, the transmitter comprises a symbol producing means for producing the control symbols by using, as the control information, control information which indicates raising the transmission power of the communication partner, control information which indicates lowering the transmission power of the communication partner, and control information which includes the contents of the control information previously sent to the communication partner and which indicates holding the transmission power of the communication partner, to assign one of the control information to the symbols, and a transmitting means for transmitting the control symbols to the communication partner.

Furthermore, a transmitting and receiving apparatus for receiving, from a communication partner, control symbols obtained by assigning control information for controlling transmission power to symbols of phase modulation, so as to control its own transmission power based on the control symbols, comprises a transmitting means for transmitting a predetermined signal to the communication partner, a receiving means for using, as the control information, control information which indicates raising transmission power, control information which indicates lowering transmission power, and control information which includes the contents of the control information previously sent and which indicates holding transmission power, and for receiving the symbols to which one of the control information is assigned, and a control means for performing error correction on the received control information based on the carrier to interference power ratio at the time when the control information is received, if the control information previously received is inconsistent with the control information received this time.

Further, in the transmitter for transmitting, a plurality of rectangular subcarriers are used to communicate with the communication partner, and the control symbols are assigned to the subcarriers, excluding the vicinity of both ends and center of the band, from among plurality of the subcarriers, and then are transmitted.

Further, in the transmitter for transmitting, using "n" band slots comprising a plurality of rectangular subcarriers for communication with the communication partner "k" subcarriers for transmitting control symbols are respectively provided in the band slots (where, n≧k) from among the "n" band slots having the number of "n", and then the control symbols are assigned one by one to the subcarriers for transmitting the control symbols to be transmitted.

Furthermore, in the transmitting and receiving apparatus, using "n" band slots comprising a plurality of rectangular subcarriers for communication, when "k" subcarriers for transmitting control symbols are respectively provided in the band slots (where, n≧k) among from the band slots, and then the same control symbols are assigned one by one to the subcarriers for transmitting the control symbols to be transmitted, the control symbols are composed in accordance with the carrier to interference power ratio of each band slot to decode the control information from the composed control symbols, and then its own transmission power is controlled based on the decoded control information.

Further, in the transmitting and receiving apparatus, using "n" band slots comprising a plurality of rectangular subcarriers for communication, when "k" subcarriers for transmitting control symbols are respectively provided in the band slots (where, n≧k) from among the "n" band slots, and then the same control symbols are assigned one by one to the subcarriers for transmitting the control symbols to be transmitted, the control symbols are picked up from the band slot having the most preferable carrier to interference power ratio to decode the control information, and then its own transmission power is controlled based on the decoded control information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 5 is a table explaining the error correction according to the first embodiment;

FIG. 7 is a table explaining the error correction according to the second embodiment;

DETAILED DESCRIPTION OF THE EMBODIMENT

Figure 1:
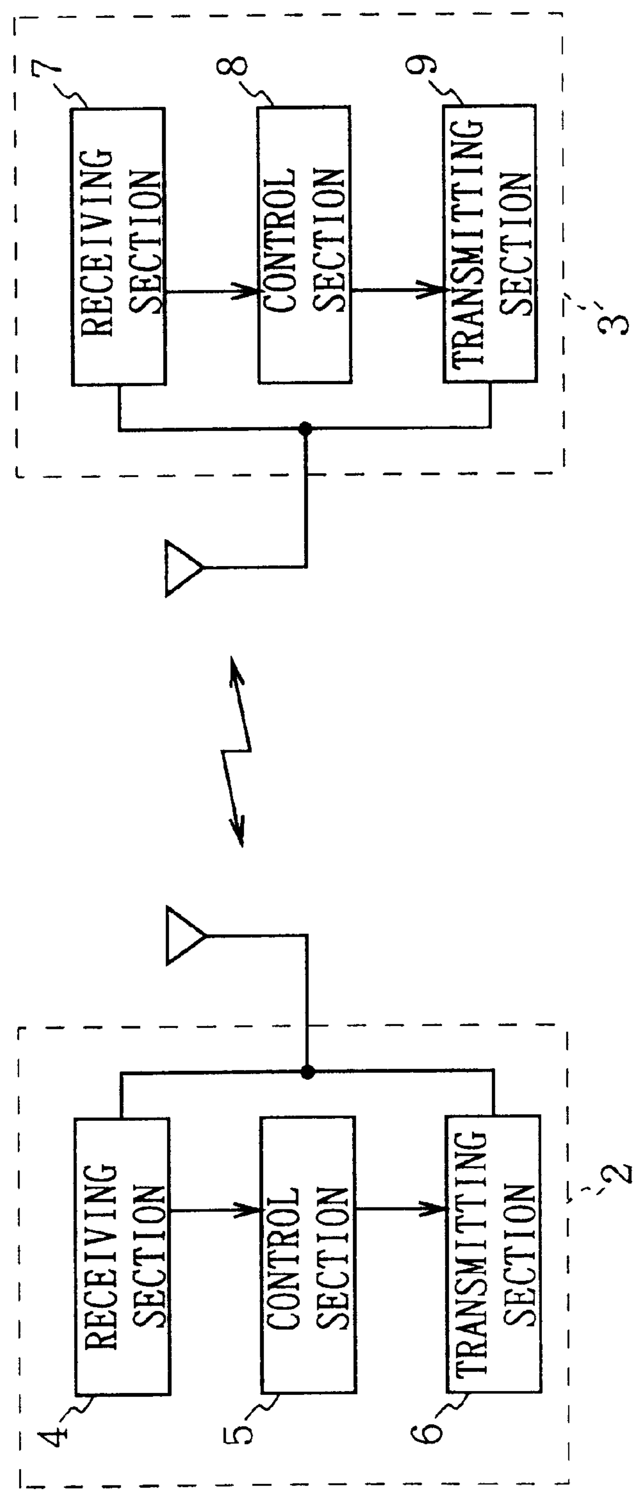
FIG. 1 is a block diagram showing the construction of a cellular wireless communication system according to this invention.

In FIG. 1, 1 shows a cellular wireless communication system according to this invention as a whole. A wireless circuit is connected between a base station 2 and a communication terminal device 3 to communicate. In this case, the base station 2 has a receiving section 4, a control section 5, and a transmitting section 6. The communication terminal device 3 also has a receiving section 7, a control section 5, and a transmitting section 9. The base station 2 and the communication terminal device 3 use these circuit blocks to communicate.

The receiving section 4 of the base station 2 receives a transmission signal from the communication terminal device 3 to demodulate the sent transmission data, and simultaneously detects control data for power control included in the transmission signal to inform the control section 5 of the detected control data. Further, the receiving section 4 detects a carrier to interference power ratio C/I (that is, the ratio of desired wave power to interference wave power) of the transmission signal sent from the communication terminal device 3, and also informs the control section 5 of the detected carrier to interference power ratio C/I.

The control section 5 generates a power control signal for controlling a own transmission power based on the control data sent from the receiving section 4, and sends this to the transmitting section 6. The control section 5 also generates control data for controlling transmission power of the communication terminal device 3 based on the carrier to interference power ratio C/I, and sends this to transmitting section 6. The transmitting section 6 controls own transmission power based on the power control signal received from the control section 5, and inserts the control data received from the control section 5 into the transmission data to generate a transmission signal, and transmits this to the communication terminal device 3.

Similarly, the receiving section 7 of the communication terminal device 3 receives a transmission signal from the base station 2 to demodulate the sent transmission data, and simultaneously detects control data for power control included in the transmission signal to inform the control section 8 of the detected control data. Further, the receiving section 7 detects the carrier to interference power ratio C/I of the transmission signal sent from the base station 2, and also informs the control section 8 of the detected carrier to interference power ratio C/I.

The control section 8 generates power a control signal for controlling its own transmission power based on the control data sent from the receiving section 7, and sends this to the transmitting section 9. The control section 8 also generates control data for controlling transmission power of the base station 2 based on the carrier to interference power ratio C/I sent from the receiving section 7, and sends this to the transmitting section 9. The transmitting section 9 controls its own transmission power based on the power control signal received from the control section 8, and inserts the control data received from the control section 8 into the transmission data to generate the transmission signal, and transmits this to the base station 2.

In this way, in the cellular wireless communication system 1, the base station 2 and the communication terminal device 3 detect the carrier to interference power ratio C/I of the transmission signal sent from each other's partner, and inform the partner of the control data of transmission power in accordance with the detected result, so as to control the transmission power.

Figure 2:
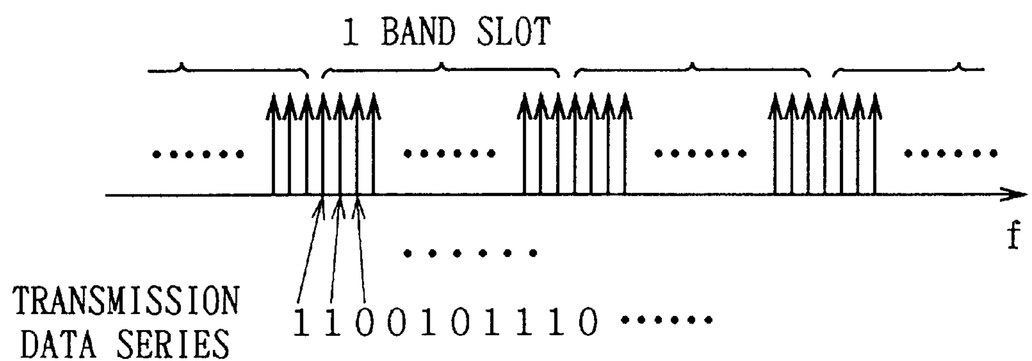
FIG. 2 is a schematic diagram explaining the principle of the OFDM method.

The cellular wireless communication system 1 uses the orthogonal frequency division multiplexing (OFDM) system which has been proposed recently to wirelessly communicate. In this connection, the OFDM system is a system that as shown in FIG. 2, one band slot or a plurality of band slots, one band slot consisting of a plurality of rectangular subcarriers, is/are used to assign the data to be transmitted to a plurality of subcarriers so as to transmit the data. Thereby, the data which is dispersed on the frequency axis can be transmitted, so as to realize the wireless communication which is hardly affected by the frequency selective feeding.

Next, the receiving section 4, 7, the control section 5, 8, and the transmitting section 6, 9 which are provided in the base station 2 and the communication terminal device 3 are explained concretely in this paragraph. Since the base station 2 and the communication terminal device 3 have the same circuit construction, the receiving section 7, the control section 8, and the transmitting section 9 of the communication terminal device 3 are only explained here.

Figure 3:
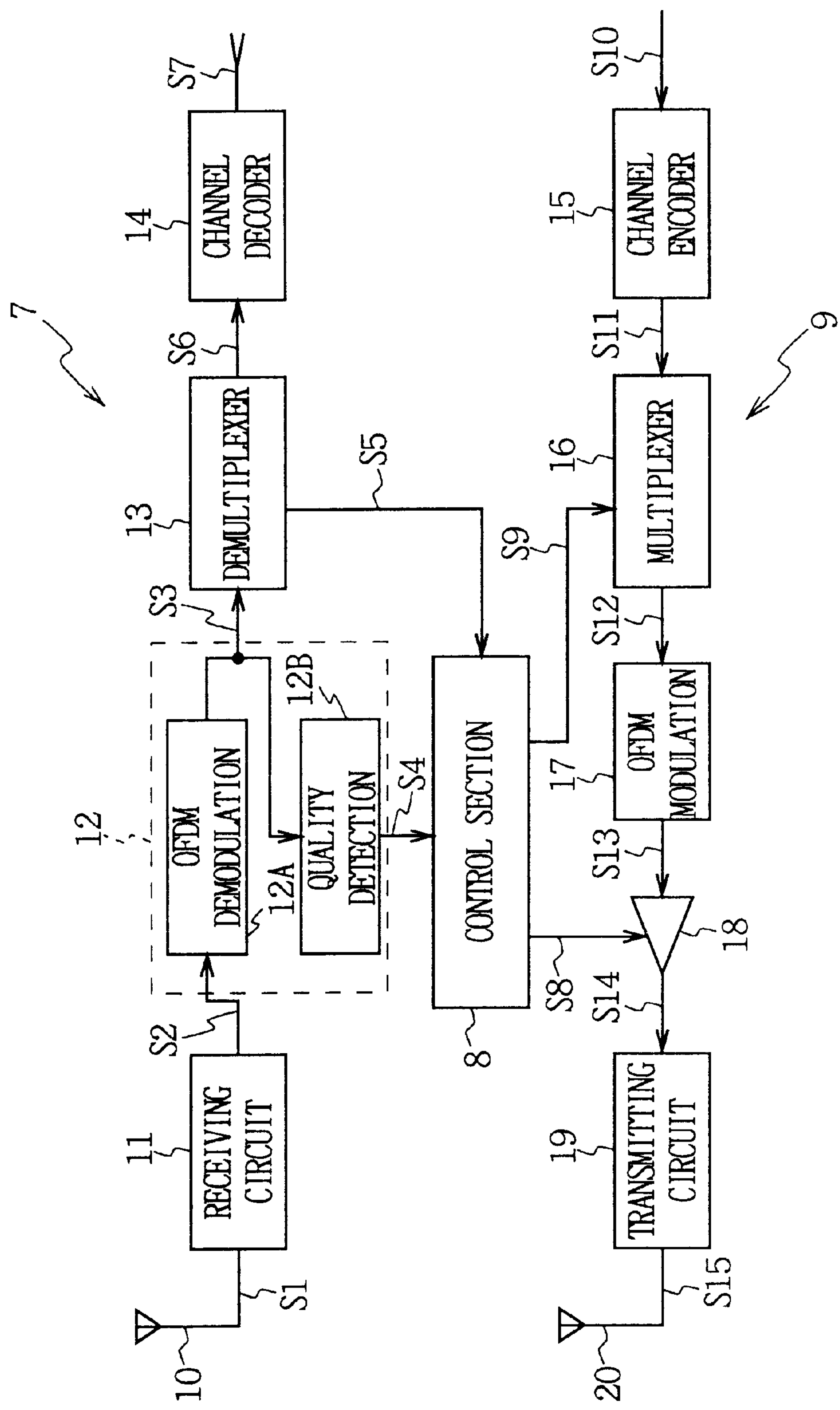
FIG. 3 is a block diagram showing the construction of a receiving section, control section, and transmitting section.

As shown in FIG. 3, in the receiving section 7, reception signal S1 received by an antenna 10 is input to a receiving circuit 11. The receiving circuit 11 amplifies the reception signal S1 and thereafter performs frequency conversion on the reception signal S1 to take out the baseband signal, and performs filtering processing on the baseband signal. The receiving circuit 11 then performs analog-to-digital conversion on the baseband signal to take out reception symbol S2, which is output to a demodulating part 12. Note that the cellular wireless communication system 1 performs wireless communication by the OFDM system, so that the reception symbol S2 taken out here is the reception symbol lined on the frequency axis.

The demodulating part 12 has an OFDM demodulating circuit 12A and a quality detecting circuit 12B, and inputs the reception symbol S2 supplied from the receiving circuit 11 to the OFDM demodulating circuit 12A. The OFDM demodulating circuit 12A performs Fourier conversion processing on the reception symbol S2 to change a series of symbols on the time axis into a series of symbols on the frequency axis, and takes out this. The OFDM demodulating circuit 12A outputs the obtained reception symbol S3 to a demultiplexer 13 at a following stage, and at the same time outputs this to the quality detecting circuit 12B. The quality detecting circuit 12B detects, for each band slot, the carrier to interference power ratio C/I at a time when the reception symbol S3 is sent, and outputs the detection data S4 indicating the detected carrier to interference power ratio to the control section 8.

The demultiplexer 13 picks up control symbol S5 relating to power control from the supplied reception symbol S3, and outputs the control symbol S5 to the control section 8. Here, one symbol of the control symbol S5 relating to power control is inserted in one band slot. The demultiplexer 13 further outputs reception symbol S6 which is remaining as a result of picking up the control symbol S5 to a channel decoder 14. The channel decoder 14 performs symbol demodulation processing on the reception symbol S6 so as to restore reception data bits S7 from the reception symbol S6, and outputs this to an audio processing circuit (not shown) at a next stage.

The control section 8 detects the control data of transmission power which is instructed by the base station 2 based on the control symbol S5 supplied from the demultiplexer 13, and generates power control signal S8 in accordance with the control data to output this to the transmitting section 9. The control section 8 further receives detection data S4 supplied from the quality detecting circuit 12B, and generates control data of transmission power relating to the base station 2 based on the carrier to interference power ratio I/C indicated by the detection data S4, to generate control symbol S9 representing the control data, which is output to the transmitting section 9.

In this connection, in the case of generating the control symbol S9, the control section 8 generates the control data which lowers the transmission power by 1 dB if the carrier to interference power ratio I/C is larger than a first threshold value, generates the control data which raises the transmission power by 1 dB if the carrier to interference power ratio I/C is smaller than a second threshold value, and generates the control data which holds the current transmission power if the carrier to interference power ratio I/C is between the first and the second threshold values. Based on these control data, the control symbol S9 is generated. Also, the carrier to interference power ratio I/C is detected for each one band slot, so that the control section 8 generates one control symbol S9 per one band slot.

While, in the transmitting section 9, transmission data bits S10 to be transmitted supplied from the audio processing circuit (not shown) are first input to a channel encoder 15, where a predetermined coding processing is performed on the transmission data bits S10 to generate transmission symbol S11. The multiplexer 16 receives the control symbol S9 from the control section 8, and at the same time receives the transmission symbol S11 from the channel encoder 15, and then inserts the control symbol S9 in a predetermined position of the transmission symbol S11 to generate transmission symbol S12. Here, since one control symbol S9 is generated per one band slot, one control symbol S9 is inserted per one band slot.

An OFDM modulating circuit 17 performs inverse Fourier conversion processing on the transmission symbol S12 to generate such transmission signal S13 that symbols lined on the frequency axis is changed into symbols lined on the time axis, and outputs this to a changeable gain amplifier 18.

The changeable gain amplifier 18 receives the power control signal S8 from the control section 8, and amplifies the transmission signal S13 by the gain value based on the power control signal S8 so as to generate the transmission signal S14 of transmission power instructed by the base station 2. The transmitting circuit 19 performs a predetermined high frequency processing such as frequency conversion on the transmission signal S14 to generate transmission signal S15, which is transmitted via an antenna 20.

Next, a method of generating control symbol S9 is explained in this paragraph. The control section 8 generates three kinds of control data as described above. More specifically, the first is control data which raises transmission power by 1 dB (hereinafter, referred to as up command), the second is control data which lowers transmission power by 1 dB (hereinafter referred to as down command), and the third is control data which holds current transmission power (hereinafter, referred to as hold command).

When such control data is transmitted, a problem is especially that the control data of contrary up command and down command are misjudged. More specifically, if the hold command and the up or down command are misjudged, a margin of error of transmission power is 1 dB. However, if the up command and the down command are misjudged, a margin of error of transmission power is 2 dB, which is larger.

Accordingly, in order to improve the control precision of transmission power, it is desired to map the control data of up and down commands on the symbols which are the most difficult to be misjudged, to generate the control symbol S9. The symbols which are the most difficult to be misjudged correspond to a pair of symbols having the longest Euclidian distance on the symbol constellation.

Figure 4:
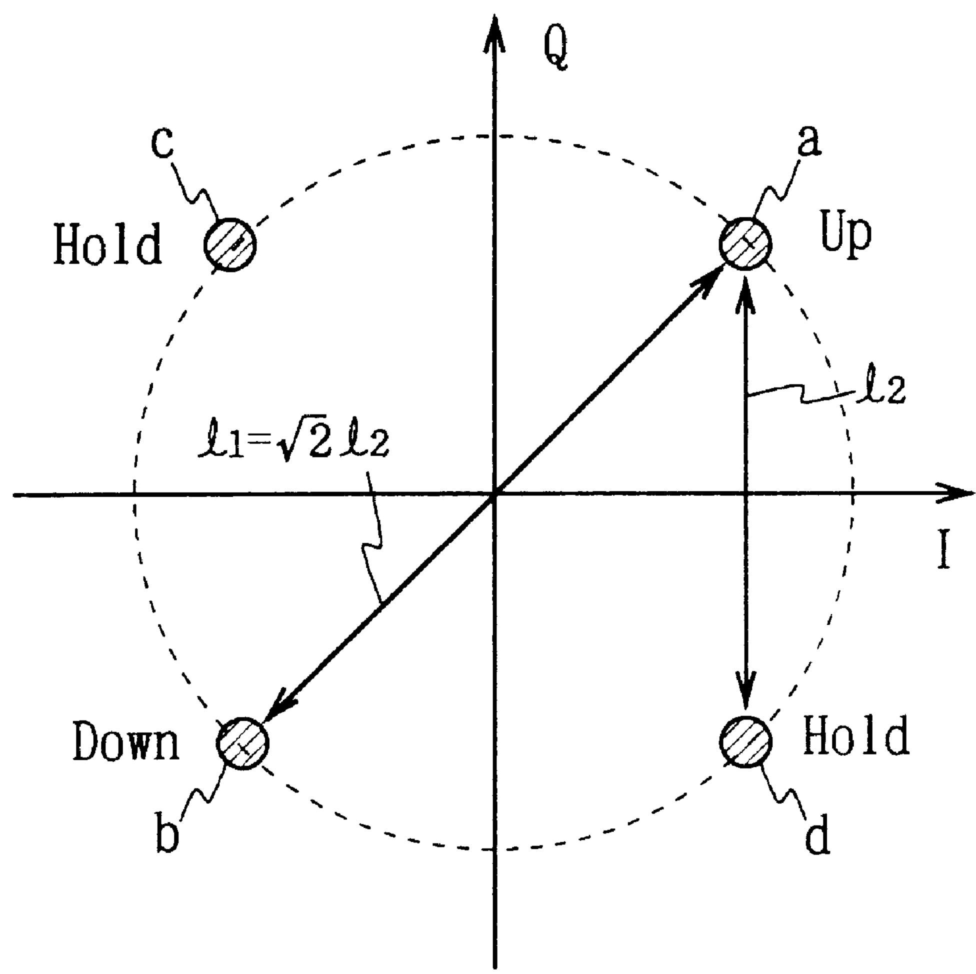
FIG. 4 is a schematic diagram explaining the method of mapping, control symbol onto the symbol of QPSK.

In a case of symbols of QPSK (Quadrature phase shift keying) modulation, as shown in FIG. 4, a pair of symbols having the longest Euclidian distance is a pair formed of symbol "a" existing on the first quadrant and symbol "b" existing on the third quadrant whose phase is shifted by $\pi$ therefrom, or a pair of symbol "c" existing on the second quadrant and symbol "d" existing on the fourth quadrant whose phase is shifted by $\pi$ therefrom. For example, as shown in FIG. 4, the up command is mapped on the symbol "a" and the down command is mapped on the symbol "b", and the hold commands are mapped on the remaining symbols "c" and "d", so as to previously avoid misjudging between the up command and the down command.

Practically, the Euclidian distance $l_1$ of symbol "a" and symbol "c" is $\sqrt{2}$ times larger than the Euclidian distance $l_2$ of symbol "a" and symbol "b"according to the theorem of trigonometry. The longer distance makes the position that the symbols are not easily misjudged even if noise or interference wave affects them.

In this way, in the control section 8, the control data of up and down commands are respectively mapped on the symbol "a" and the symbol "b" which have the longest Euclid distance as shown in FIG. 4, based on the principle described above, so as to generate the control symbol S9.

In addition, in case of the control section 8, strictly speaking, the hold command is classified into two commands: a command for holding transmission power this time which has up command as a previous command (hereinafter, referred to as up hold command); and a command for holding transmission power this time which has down command as a previous command (hereinafter, referred to as down hold command). The up hold command is mapped on the symbol "c" and the down hold command is mapped on the symbol "d".

Next, a method of controlling transmission power based on the received control symbol S5 is explained in this paragraph. The control symbol S5 transmitted from the base station 2 also comprises control data composed of up command, down command, up hold command, and down hold command as described above. The control data of each command is assigned to each of symbols "a" to "d" by mapping as shown in FIG. 4, to generate the control symbol S5.

To determine the received control symbol S5, the control section 8 thereby determines that the received control symbol S5 corresponds to which of symbols "a" to "d" shown in FIG. 4, so as to determine the command indicated by the control symbol S5.

Both of the up hold command and the down hold command include one previous command respectively. Thereby, when the up hold command or the down hold command is received, error correction can be performed based on the command. The error correction is explained below concretely. Note that since a current command is compared to one previous command to perform the error correction, the control section 8 has a memory, and uses the memory to store one previous command.

The control section 8 first stores the contents of control data previously received in a memory. When receiving the control data newly, the control section 8 compares the previous control data stored in the memory to the control data newly received, to determine whether or not the previous control data has been misjudged based on the compared result. If it has been misjudged, the transmission power is so controlled that the previous error is corrected.

More specifically, as shown at A in FIG. 5, when the judged result of previous control data is up command and the judged result of current control data is up hold command, there is no inconsistency between the previous command and the current command, so that the transmission power is held according to the current command. Further, as shown at B in FIG. 5, when the judged result of previous control data is up command and the judged result of current control data is down hold command, there is a inconsistency between the previous command and the current command. In this case, the previous judged result is decided as an error, and the transmission power is lowered by 2 dB according to the current command, 2 dB including the raising of transmission power at a previous time. Further, as shown at C in FIG. 5, when the judged result of previous control data is up command and the judged result of current control data is also up command, there is no inconsistency between the previous command and the current command, so that the transmission power is raised by 1 dB according to the current command.

Further, as shown at D in FIG. 5, when the judged result of previous control data is up command and the judged result of current control data is down command, there is no inconsistency between the previous command and the current command, so that the transmission power is lowered by 1 dB according to the current command. As shown at E in FIG. 5, when the judged result of previous control data is down command and the judged result of current control data is up hold command, there is an inconsistency between the previous command and the current command. In this case, the previous judged result is decided as an error, and the transmission power is raised by 2 dB according to the current command, 2 dB including the lowering of transmission power at a previous time. As shown at F in FIG. 5, when the judged result of previous control data is down command and the judged result of current control data is down hold command, there is no inconsistency between the previous command and the current command, so that the transmission power is held according to the current command.

Similarly, as shown at G, (H), (J), (K), (L), (N), (O), and (P) in FIG. 5, when there is no inconsistency between the judged result of the previous command and the judged result of the current command, the transmission power is controlled according to the current command.

On the contrary to this, as shown at I in FIG. 5, when the judged result of previous control data is up hold command and the judged result of current control data is up hold command, there is an inconsistency between the previous command and the current command. In this case, the transmission power, which is held by mistake at a previous time, is raised by 1 dB this time according to the current command. As shown in FIG. 5(M), when the judged result of previous control data is down hold command and the judged result of current control data is up hold command, there is an inconsistency between the previous command and the current command. In this case, the transmission power, which is held by mistake at a previous time, is raised by 1 dB this time according to the current command.

In this way, the hold command is not a command for only holding transmission power, but is classified into up hold command and down hold command which include the previous control data. Thereby, since the hold commands include the contents of previous commands, if the previous judged result is inconsistent with the current judged result, it can be judged as an error. Then, the error is corrected to control the transmission power exactly.

Figure 6:
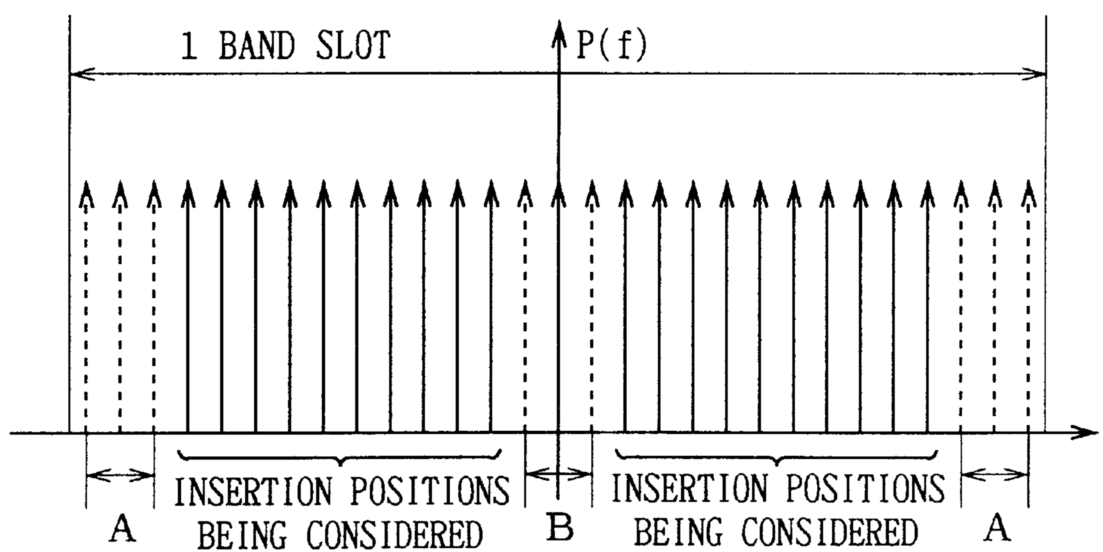
FIG. 6 is a schematic diagram explaining the position of inserting control symbol representing control data.

Next, the position of inserting the control symbol S9 generated by the control section 8 by mapping shown in FIG. 4 is explained in this paragraph. As described above, the cellular wireless communication system 1 communicates by the OFDM system. The transmission symbol S12 is assigned to a plurality of rectangular subcarriers to be transmitted. More specifically, as shown in FIG. 6, several tens of subcarriers collected are defined as one band slot, and the transmission symbol S12 is dispersed and assigned to a plurality of subcarriers comprising one band slot. Accordingly, the control symbol S9 inserted into the transmission symbol S12 is also assigned to one of a plurality of subcarriers in one band slot.

In case of communication using the OFDM system, at a receiving side, the frequency component of one band slot is picked up by filtering processing and the Fourier conversion is performed on the picked signal component, so as to pick up the original symbol data. At this time, a band pass filter to be used can not cut the signal component steeply at both ends of the band, and cut the signal component gradually from the inside of both ends of the band, thereby this may cause a change in the amplitude and phase of subcarriers (about three subcarriers) in the vicinity A of both ends of band slot as shown in FIG. 6. Moreover, the vicinity A of the both ends is likely to be affected by jamming outside the band such as signal leakage from an adjacent band slot. Further, the subcarriers (about three subcarriers) in the vicinity B of center of band slot may change in its amplitude and phase due to the direct-current component cut when converted into baseband signal. For these reasons, the transmission quality of subcarriers in the vicinity A of both ends of the band slot and the vicinity B of center of the band slot are likely to be degraded.

Accordingly, the multiplexer 16 inserts the control symbol S9 such that the control symbol S9 is assigned to subcarriers excluding the subcarriers in the vicinity A of both ends of band slot and the vicinity B of center of the band slot when assigning the transmission symbol S12 to subcarriers by the OFDM modulating circuit 17 at a later stage. The control symbol S9 is assigned to subcarriers other than the subcarriers in the vicinity A of both ends of the band slot and the vicinity B of center, and transmitted, so that the amplitude and phase characteristics of the control symbol S9 can be previously prevented from degradation and the control symbol S9 can be transmitted correctly.

In the construction described above, in case of the cellular wireless communication system 1, the base station 2 and the communication terminal device 3 detect the carrier to interference power ratio I/C of transmission signal from a partner each other, and generate control data for controlling transmission power of the communication partner based on the detected result, and informs this to the partner to control the transmission power. To transmit control data to the partner, the control data is assigned to the symbols of QPSK modulation, and the control symbol S9 obtained as a result is transmitted. At this time, the control data which indicates raising the transmission power (i.e., up command) and the control data which indicates lowering the transmission power (i.e., down command) are assigned to symbols “a” and “b” which have the longest Euclidian distance among four symbols. By assigning the contrary control data to symbols “a” and “b” having the longest Euclidian distance, a pair of symbols are apart from each other on the signal constellation, so that the symbols are previously prevented from a change into opposite symbols each other, even if noise or interference wave affects them. Thereby, this makes it possible to improve the transmission quality of contrary control data, and transmission power can be controlled more correctly.

Further, to the remaining symbols “c” and “d” of four symbols, a command for holding transmission power this time which has a up command at a previous time (i.e., up hold command) or a command for holding transmission power this time which has a down command at a previous time (i.e., down hold command) is assigned. The hold command which includes one previous command is assigned to symbols “c” and “d”, so that the receiving side compares a command one previously received and a command received this time to judge whether a command is correct or not. If there is an error, the error is corrected to control the transmission power exactly.

Also, the control symbol S9 generated by assigning symbols as described above is assigned to subcarriers positioned in areas other than the vicinity A of both ends and the vicinity B of center in the band slot comprising a plurality of subcarriers, and transmitted, so that the amplitude and phase characteristics of the control symbol S9 can be previously prevented from a change, and the control symbols S9 can be transmitted correctly.

With the above construction, the contrary control data such as up command and down command are assigned to a pair of symbols “a” and “b” having the longest Euclid distance, so that the transmission quality of contrary control data can be improved and thereby controlling the transmission power more correctly. Further, the hold command including one previous command is transmitted as control data, so that when the control data is misjudged, the error can be corrected to control the transmission power exactly. Further, the control symbol S9 indicating the control data is assigned to subcarriers excluding subcarriers at both ends and at center of the band slot, so that the amplitude and phase characteristics of the control symbol S9 can be previously prevented from degrading, and the affection to other communication as interference wave can be previously avoided.

The first aspect of implementation described above has dealt with the case where when the judged result of one previous control data is inconsistent with the judged result of current control data, one previous judged result is decided as an error with a strong probability and is corrected. However, in the second embodiment, when there is an inconsistency between the judged results, the probability that which of judged results is an error is determined to select the judged result which seems to be correct.

As data to make a decision whether or not the judged result of control data is an error, the second embodiment uses the carrier to interference power ratio C/I at the time when the control data (i.e., control symbol S5) is transmitted. Normally, the data error rate intends to be high in case of bad carrier to interference power ratio C/I, and contrarily the data error rate intends to be low in case of good carrier to interference power ratio C/I. Hence, the carrier to interference power ratio C/I is proportional to data error rate, and it can be determined that which of judged results is an error based on the carrier to interference power ratio C/I. Moreover, the quality detecting circuit 12B detects, for each band slot, the carrier to interference power ratio C/I of the reception symbol S3 received for generating control symbol S9 which is sent to a partner, and it is unnecessary to newly provide a detecting circuit. Thereby, in the second embodiment, the detection data S4 from the quality detecting circuit 12B is used to perform error correction.

Here, the error correction according to the second embodiment is explained with reference with FIG. 7 which corresponds to FIG. 5. Note that in the second embodiment, since the error correction is performed by comparison of the carrier to interference power ratio C/I, the carrier to interference power ratio C/I at the time of receiving the previous command is also stored in a memory, in addition to the previous command.

As shown at A and B in FIG. 7, when the judged result of previous control data is up command and the judged result of current control data is up hold command, there is no inconsistency between the previous command and the current command, so that the transmission power is held according to the judged result of current control data, regardless of the carrier to interference power ratio C/I. Similarly, as shown in FIG. 7(E) to (H), (K) to (P), (S) to (X), (a) to (f) in FIG. 7, when there is no inconsistency between the judged result of previous control data and the judged result of current control data, the transmission power is controlled according to the judged result of current control data.

On the contrary to this, as shown at C in FIG. 7, when the judged result of previous control data is up command and the judged result of current control data is down hold command, there is an inconsistency between the previous command and the current command. Then, the carrier to interference power ratio C/I of the previous time and this time are compared. As a result, if the carrier to interference power ratio C/I of the previous time is larger than the carrier to interference power ratio C/I of this time, it is decided that the previous control data is correctly judged and the current control data is misjudged, to hold the transmission power this time. In this case, it is decided that there is an error in the current judgement. However, since the difference of transmission power becomes larger if the transmission power is raised or lowered excessively, the transmission power is held here. While, as shown at D in FIG. 7, if the carrier to interference power ratio C/I of this time is larger than the carrier to interference power ratio C/I of the previous time, it is decided that the previous control data is misjudged, to lower the transmission power by 2 dB this time which includes the previous transmission power raised by mistake.

Also, as shown at I in FIG. 7, when the judged result of previous control data is down command and the judged result of current control data is up hold command, there is an inconsistency between the previous command and the current command. Then, the carrier to interference power ratio C/I of the previous time and this time are compared. As a result, if the carrier to interference power ratio C/I of this time is larger than the carrier to interference power ratio C/I of the previous time, it is decided that the previous control data is misjudged, to raise the transmission power by 2 dB this time which includes the previous transmission power lowered by mistake. While, as shown at J in FIG. 7, if the carrier to interference power ratio C/I of the previous time is larger than the carrier to interference power ratio C/I of this time, it is decided that the previous control data is correctly judged, to hold the transmission power this time.

Also, as shown at Q in FIG. 7, when the judged result of previous control data is up hold command and the judged result of current control data is up hold command, there is an inconsistency between the previous command and the current command. Then, the carrier to interference power ratio C/I of the previous time and this time are compared. As a result, if the carrier to interference power ratio C/I of this time is larger than the carrier to interference power ratio C/I of the previous time, it is decided that the previous control data is misjudged, to raise the transmission power by 1 dB this time as the previous transmission power held by mistake. While, as shown at R in FIG. 7, if the carrier to interference power ratio C/I of the previous time is larger than the carrier to interference power ratio C/I of this time, it is decided that the previous control data is correctly judged, to hold the transmission power this time.

Also, as shown at Y in FIG. 7, when the judged result of previous control data is down hold command and the judged result of current control data is up hold command, there is an inconsistency between the previous command and the current command, Then, the carrier to interference power ratio C/I of the previous time and this time are compared. As a result, if the carrier to interference power ratio C/I of this time is larger than the carrier to interference power ratio C/I of the previous time, it is decided that the previous control data is misjudged, to raise the transmission power by 1 dB this time as the previous transmission power held by mistake. While, as shown at Z in FIG. 7, if the carrier to interference power ratio C/I of the previous time is larger than the carrier to interference power ratio C/I of this time, it is decided that the previous control data is correctly judged, to hold the transmission power this time.

In this way, if there is an inconsistency between the judged result of previous control data and the judged result of current control data, the carrier to interference power ratio C/I at the time of previously transmitting the control data is compared to the carrier to interference power ratio C/I at the time of currently transmitting the control data. Thereby, it can be decided that which of the judged results of control data is an error, and if there is a misjudgment, it is corrected and the transmission power can be controlled more correctly.

With the above construction, when an inconsistency occurs between the judgments of control data, the carrier to interference power ratio C/I is compared. Thereby, it can be decided that which of the judged results is an error, and it is corrected if there is a misjudgment, to control the transmission power more correctly. Further, the transmission power can be controlled more correctly, so as to avoid affection to other communication as an interference wave.

The embodiment described above have been dealt with the case where respective control data are assigned to a pair of symbols "a" and "b" having the longest Euclidian distance to map the contrary control data (i.e., up command and down command) on the symbols of QPSK modulation. However, this invention is not limited to this, but when the contrary control data are assigned to symbols of other phase modulation such as 8-PSK (Phase Shift Keying) and 16-QAM (Quadrature Amplitude Modulation), the control data can be similarly assigned to a pair of symbols having the longest Euclidian distance in which the phase is approximately $\pi$ away from each other, so that the same effect as described above can be obtained.

Figure 8:
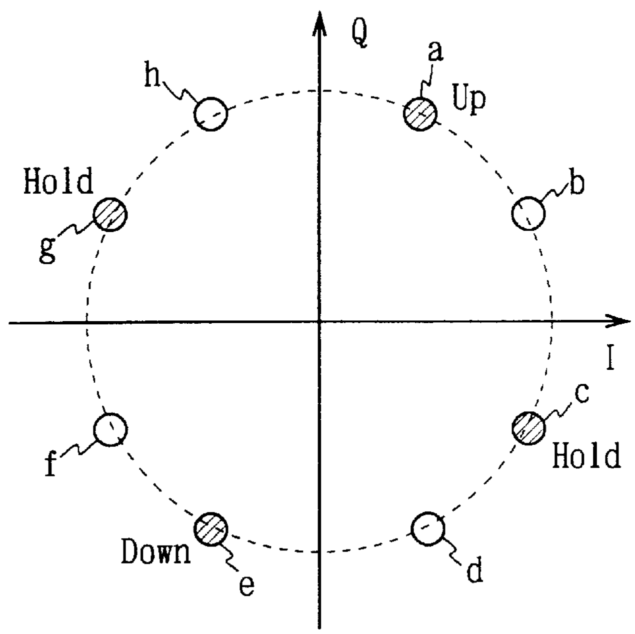
FIG. 8 is a schematic diagram explaining the method of mapping control symbol onto the symbol of 8-PSK.

For instance, in the case of 8-PSK, as shown in FIG. 8, arbitrary one symbol and three symbols which has the phase integer times of $\pi/2$ away from the arbitrary symbol are selected among from eight symbols "a" to "h", and the contrary control data are assigned to a pair of symbols having the longest Euclid distance among from the four symbols. For example, as shown in FIG. 8, the symbols "a", "c", "e", and "g" are selected as the four symbols, and contrary up command and down command are respectively assigned to a pair of symbols "a" and "e" and hold command is assigned to each of the remaining symbols "c" and "g". Then, the distance on the signal constellation is apart between contrary up command and down command, so that misjudgment of command can be previously avoided and the transmission power can be controlled correctly.

Figure 9:
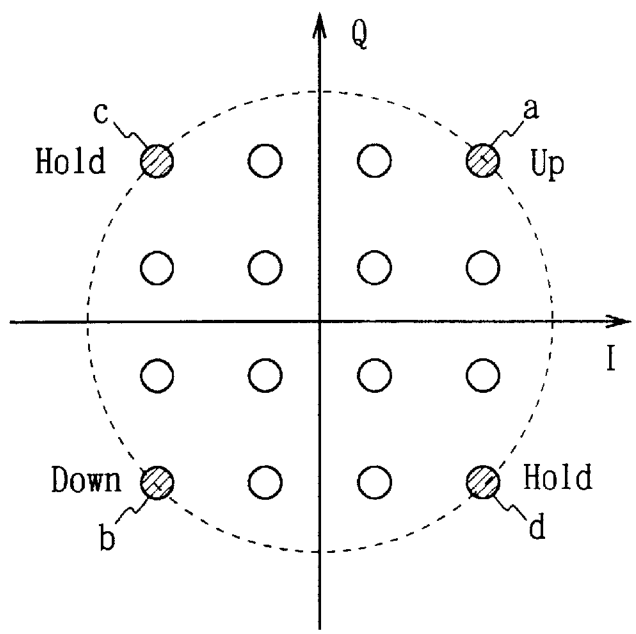
FIG. 9 is a schematic diagram explaining the method of mapping control symbol onto the symbol of 16-QAM.
Figure 10:
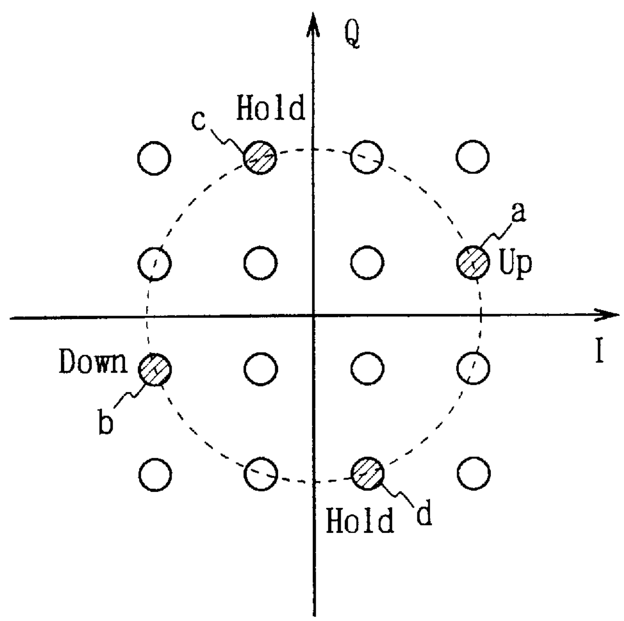
FIG. 10 is a schematic diagram explaining the method of mapping control symbol onto the symbol of 16-QAM.

Also, in the case of 16-QAM, two methods can be considered as shown in FIGS. 9 and 10 because a plurality of symbols each having the different amplitude exist. In one method, as shown in FIG. 9, four symbols "a" to "d" which has the largest amplitude are selected among from symbols of 16-QAM, to assign the contrary up command and down command to a pair of symbols "a" and "b" in which the phase is $\pi$ away from each other among from the four symbols, and to assign the hold command to the remaining symbols "c" and "d". In this way, the contrary control data are assigned to a pair of symbols "a" and "b", so that the distance on the signal constellation is apart between them and thereby misjudgment of command can be previously avoided and the transmission power can be controlled correctly.

Also, in the other method, as shown in FIG. 10, four symbols "a" to "d" which are $\pi/2$ away from each other are selected among from eight symbols excluding symbols having the maximum amplitude and the minimum amplitude from the symbols of 16-QAM, to assign the contrary up command and down command to a pair of symbols "a" and "b" in which the phase is r away from each other among from the four symbols "a" to "d", and to assign the hold command to the remaining symbols "c" and "d". In this way, the contrary control data are assigned to a pair of symbols "a" and "b", so that although the distance is not apart between them comparing to the method shown in FIG. 9, actually sufficient distance can be secured. Thereby, misjudgment of command can be previously avoided and the transmission power can be controlled correctly.

In this connection, although the case of 16-QAM has been explained here, this invention is not only limited to this, but also other multiple value amplitude phase modulation such as 64-QAM can be used. In this case, when applying the method corresponding to FIG. 9, four symbols having the maximum amplitude are selected among from all symbols, to assign the contrary control data (i.e., up command and down command) to a pair of symbols in which the phase is $\pi$ away from each other among from the four symbols, and to assign the control data of hold command to the remaining two symbols, so that the same effect as described above can be obtained. Further, when applying the method shown in FIG. 10, four symbols in which the phase is $\pi/2$ away from each other are selected among from the symbols excluding the symbols having the maximum and minimum amplitude, to assign the contrary control data (i.e., up command and down command) to a pair of symbols in which the phase is $\pi$ away from each other among from the four symbols, and to assign the control data of hold command to the remaining two symbols, so that the same effect as described above can be obtained.

Figure 11:
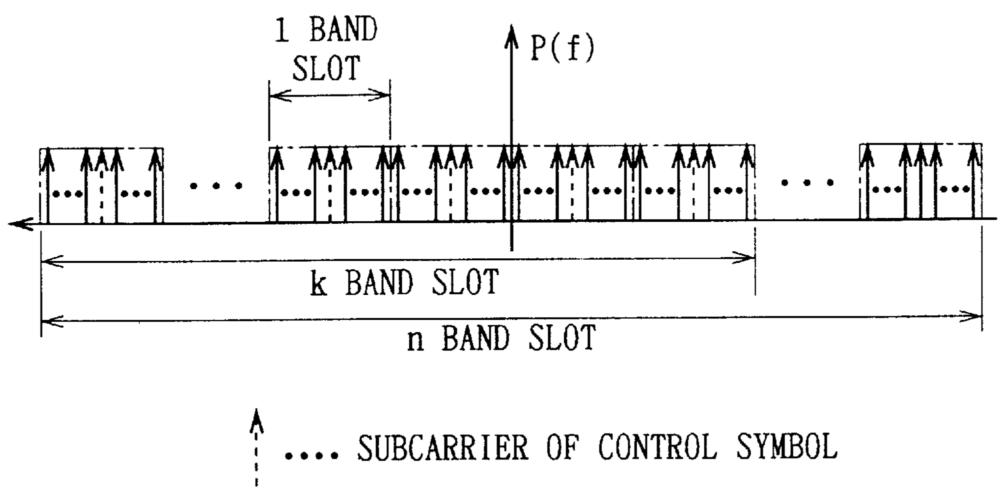
FIG. 11 is a schematic diagram explaining the method of transmitting control symbol by a method using multi band slot.

Further, the embodiment described above have been dealt with the case where one band slot is used to communicate with a communication partner, and one control symbol S9 for controlling transmission power is inserted in the band slot. However, this invention is not only limited to this, but also a plurality of band slots, that is multi band slot, can be used to communicate with a communication partner, and the control symbol S9 is inserted to each band slot. In this case, as shown in FIG. 11, the band slots having the number of "n" are used for multi band slot communication. Subcarriers to which the control symbol S9 representing the same control data are assigned are inserted in the band slots having the number of "k" (where, $n \geqq k$) to be transmitted. When the subcarriers to which the same control symbol S9 are assigned in each band slots are transmitted in this way, the control symbol S9 picked up from each band slot can be composed in accordance with the carrier to interference power ratio C/I of each band slot at a receiving side, so that the control data from the communication partner can be decoded based on the composed control symbol. Accordingly, the diversity reception by the maximum ratio composing method can be performed on the control symbol S9, so that the control symbol S9 can be transmitted more accurately and the transmission power can be controlled correctly.

Further, the received control symbol S9 is not composed in accordance with the carrier to interference power ratio C/I, and the control data may be decoded based on the control symbol S9 picked up from the band slot having the best carrier to interference power ratio C/I. Thus, the especial effect can be obtained such that although the performance falls off a little comparing to the diversity reception according to the maximum ratio composing method, the selective diversity reception can be performed with the structure simpler to the diversity reception according to the maximum ratio composing method, so that the control data can be exactly decoded within the practically sufficient range.

Further, in the above methods, the control symbol S9 representing the same control data is inserted in each band slot. However, all of subcarriers for transmitting control symbol, which have been prepared in each band slot, may be used to send one control data. Thus, the control data of multiple value can be sent so as to control the transmission power more finely and the transmission power can be controlled more efficiently. For example, symbols of BPSK (Binary Phase Shift Keying) modulation is used as a symbol to represent k-bit control data one bit by one bit. The resultant k control symbols are respectively assigned to subcarriers for transmitting control symbols in the "n" band slots one by one, and then they are transmitted. The data extends over the band slots, but the control data comprising "k" bits can be transmitted. Thereby, the control data for controlling the transmission power is represented by the soft decision value and the transmission power can be controlled more finely.

Further, not only the multiple value, but also one bit of even number parity detection bit is added to k-bit control data to comprise the control data with (k+1) bits. The (k+1) bits of control data is represented by the symbols of BPSK one bit by one bit. The resultant control symbols having the number of (k+1) are assigned to subcarriers for transmitting control symbols in the band slots having the number of (k+1) to be transmitted. Thus, the even number parity detection bit for the control data can be transmitted, and the even number parity detection bit is used to detect an error at a receiving side, so that the transmission quality of the control data of multiple value can be improved significantly. In short, not only the multiple value, but also the control data is formed by multiple information with the error detection and/or correction bits, and the control data is transmitted using the subcarriers for transmitting control symbols. Thus, the transmission quality of control data can be improved significantly.

Further, the embodiment described above have been dealt with the case where the carrier to interference power ratio C/I is detected by the quality detecting circuit 12B to generate the control data for controlling transmission power of a communication partner. However, this invention is not only limited to this, but the reception power of the received reception signal S2 itself is detected to generate the control data for controlling transmission power of the communication partner based on the reception power.

Furthermore, the embodiment described above has been dealt with the case where the hold command is classified into two commands; up hold command which represents holding transmission power this time and which has up command at a previous time, and down hold command which represents holding transmission power this time and which has down command or a command for holding transmission power at a previous time. However, this invention is not only limited to this, but the hold command can be classified into two commands; hold command which represents holding transmission power this time and which has up command or hold command at a previous time, and hold command which represents holding transmission power this time and which has down command or a command for holding transmission power at a previous time. This also can obtain the same effect as described above.

According to the present invention described above, contrary control information is assigned to a pair of symbols having the longest Euclidian distance, so that even if receiving noise or interference wave during transmission, the judgment of control information can be previously prevented from misjudging because the distance on the signal constellation is apart from each other, and the control information can be transmitted exactly.

Further, the control information including the control information given one previously is transmitted to a communication partner. Thereby, at a receiving side, the misjudgment of control information can be detected based on the control information received one previously and the control information including the control information given one previously. When there is an error, the power control which corrects the error can be performed.

Also, the control symbols are assigned to subcarriers excluding the vicinity of both ends and the vicinity of center among from a plurality of subcarriers, so that the amplitude and phase characteristics of control symbol can be prevented from changing, and the control information can be transmitted exactly.

Furthermore, the control symbols are assigned to subcarrier for transmitting a plurality of control symbols to be transmitted. Thereby, at a receiving side, the diversity reception can be performed by the plurality of control symbols, so as to transmit the control symbol exactly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A control information transmitting method for transmitting, to a communication partner, control symbols obtained by assigning control information for controlling transmission power to symbols of phase modulation, so as to control the transmission power of said communication partner, said control information transmitting method comprising the steps of:

assigning said control information which indicates raising said transmission power of said communication partner and said control information which indicates lowering said transmission power of said communication partner to a pair of symbols having the longest Euclidian distance between the symbols from among said symbols of phase modulation;

selecting said phase modulation to be multiple value amplitude phase modulation, in which symbols having the maximum and minimum amplitudes are excluded from all symbols;

selecting four symbols, the respective phases of which are $\pi/2$ away from each other, from among the remaining symbols;

assigning control information which indicates raising said transmission power and control information which indicates lowering said transmission power, respectively, to a pair of symbols the respective phases of which are $\pi$ away from each other, from among the four symbols; and assigning control information which indicates holding said transmission power of said communication partner respectively to the remaining two symbols.

2. The control information transmitting method according to claim 1, further comprising the steps of:

selecting phase modulation to be Quadrature phase shift keying; and assigning said control information which indicates holding said transmission power of said communication partner to remaining two symbols of said Quadrature phase shift keying chase modulation.

3. The control information transmitting method according to claim 1, further comprising the steps of:

selecting said phase modulation to be 8-phase shift keying, selecting therefrom four symbols the respective phases of which are $\pi/2$ away from each other from among eight symbols, assigning said control information which indicates raising said transmission power and control information which indicates lowering said transmission power are respectively assigned to a pair of symbols the phase of which are $\pi$ away from each other from among the remaining four symbols, and assigning control information which indicates holding said transmission power of said communication partner to the remaining two symbols.

4. The control information transmitting method according to claim 1, further comprising the steps of:

selecting said phase modulation to be multiple value amplitude phase modulation, in which four symbols having a maximum amplitude are selected from among all symbols thereof, and assigning said control information which indicates raising said transmission power and control information which indicates lowering said transmission power respectively to a pair of symbols the phase of which are $\pi$ away from each other from among the four symbols, and assigning control information which indicates holding said transmission power of said communication partner to the remaining two symbols.

5. A control information transmitting method of transmitting, to a communication partner, control symbols obtained by assigning control information for controlling transmission power to symbols of phase modulation, so as to control a transmission power of said communication partner, comprising the steps of:

selecting as said control information for controlling transmission power, one of control information which indicates raising said transmission power of said communication partner, control information which indicates lowering said transmission power of said communication partner, and control information which includes contents of one control information previously sent to said communication partner and which indicates holding said transmission power of said communication partner, and transmitting to said communication partner said control symbols assigned to said control information selected in said step of selecting.

6. The control information transmitting method according to claim 5, further comprising the steps of:

selecting said phase modulation to be Quadrature phase shift keying, assigning said control information which indicates raising said transmission power and said control information which indicates lowering said transmission power respectively to a pair of symbols the respective phases of which are $\pi$ away from each other from among the four symbols, and assigning control information which indicates holding said transmission power of said communication partner and which includes previous control information indicating lowering or holding said transmission power and control information which indicates holding said transmission power of said communication partner and which includes the previous control information indicating raising or holding said transmission power respectively to the remaining two symbols.

7. The control information transmitting method according to claim 5, further comprising the steps of:

determining at a receiving side that has received said control information whether said control information previously received is inconsistent with said control information currently received, and performing error correction based on a carrier to interference power ratio at a time when the control information is received.

8. A control information transmitting method for transmitting, to a communication partner, control symbols obtained by assigning control information for controlling transmission power to symbols of phase modulation, so as to control the transmission power of said communication partner, said control information transmitting method comprising the steps of:

using "n" band slots having a plurality of rectangular subcarriers for communication with said communication partner, providing "k" subcarriers for transmitting control symbols respectively in the band slots (wherein, $n \geqq k$} from among the "n" band slots, and assigning said control symbols one by one to said subcarriers for transmitting the control symbols.

9. The control information transmitting method according to claim 8, further comprising the steps of:

respectively assigning said control symbols indicating the same control information to said subcarriers for transmitting the control symbols, and at a receiving side where said control symbols are received, composing the control symbols in accordance with a carrier to interference power ratio of each band slot to decode said control information from said composed control symbols.

10. The control information transmitting method according to claim 8, further comprising the steps of:

respectively assigning said control symbols indicating the same control information to said subcarriers for transmitting the control symbols, and at receiving side where said control symbols are received, picking up said control symbols from the band slot having a predetermined carrier to interference power ratio to decode said control information.

11. The control information transmitting method according to claim 8, wherein said control information is multiple value data, and a plurality of said subcarriers for transmitting control symbols are used to transmit the control information comprising said multiple value data.

12. The control information transmitting method according to claim 8, wherein said control information is multiple value data having error detection and/or correction bits, and a plurality of said subcarriers for transmitting control symbols are used to transmit the control information comprising said multiple value data.

13. A transmitter for transmitting, to a communication partner, control symbols obtained by assigning control information for controlling transmission power to symbols of phase modulation, so as to control the transmission power of said communication partner, said transmitter comprising:

symbol producing means for producing said control symbols by assigning said control information which indicates raising said transmission power of said communication partner and said control information which indicates lowering said transmission power of said communication partner to a pair of symbols having a longest Euclidian distance between the symbols from among said symbols of phase modulation; and transmitting means for transmitting said control symbols to said communication partner; wherein said symbol producing means include means for setting said phase modulation to multiple value amplitude phase modulation, and excluding symbols having maximum and minimum amplitudes from all symbols, for selecting four symbols, the phase of which are $\pi/2$ away from each other from among the remaining symbols, and for assigning control information which indicates raising said transmission power and control information which indicates lowering said transmission power respectively to a pair of symbol, the phase of which are $\pi$ away from each other, from among the four symbols, and then for assigning control information which indicates holding said transmission power of said communication partner, respectively, to the remaining two symbols.

14. The transmitter according to claim 13, wherein said symbol producing means includes means for setting said phase modulation to Quadrature phase shift keying, and for assigning said control information which indicates holding said transmission power of said communication partner respectively to the remaining two symbols.

15. The transmitter according to claim 13, wherein said symbol producing means includes means for setting said phase modulation to 8-phase shift keying, for selecting four symbols the phase of which are $\pi/2$ away from each other among from eight symbols, and for assigning control information which indicates raising said transmission power and control information which indicates lowering said transmission power respectively to a pair of symbols the phase of which are $\pi$ away from each other from among the four symbols, and then for assigning control information which indicates holding said transmission power of said communication partner respectively to the remaining two symbols.

16. The transmitter according to claim 13, wherein said symbol producing means includes means for setting said phase modulation to multiple value amplitude phase modulation, for selecting four symbols having a maximum amplitude among from all symbols, and for assigning control information which indicates raising said transmission power and control information which indicates lowering said transmission power respectively to a pair of symbols the phase of which are $\pi$ away from each other from among the four symbols, and then for assigning control information which indicates holding said transmission power of said communication partner respectively to the remaining two symbols.

17. A transmitter for transmitting, to a communication partner, control symbols obtained by assigning control information for controlling transmission power to symbols of phase modulation, so as to control the transmission power of said communication partner, said transmitter comprising:

symbol producing means for producing said control symbols by using, as said control information, control information which indicates raising said transmission power of said communication partner, control information which indicates lowering said transmission power of said communication partner, and control information which includes contents of the control information previously sent to said communication partner and which indicates holding said transmission power of said communication partner, and for assigning one of said control information to said symbols; and transmitting means for transmitting said control symbols to said communication partner.

18. The transmitter according to claim 17, wherein said symbol producing means includes means for setting said phase modulation to Quadrature phase shift keying, and for assigning control information which indicates raising said transmission power and control information which indicates lowering said transmission power respectively to a pair of symbols the phase of which are $\pi$ away from each other among from four symbols, and then for assigning control information which includes the previous control information indicating lowering or holding said transmission power and which indicates holding said transmission power of said communication partner and control information which includes the previous control information indicating raising or holding said transmission power and which indicates holding said transmission power of said communication partner respectively to the remaining two symbols.

19. A transmitting and receiving apparatus for receiving, from a communication partner, control symbols obtained by assigning control information for controlling transmission power to symbols of phase modulation, so as to control transmission power of the apparatus based on the control symbols, said transmitting and receiving apparatus comprising:

transmitting means for transmitting a predetermined signal to said communication partner;

receiving means for using, as said control information, control information which indicates raising transmission power, control information which indicates lowering transmission power, and control information which includes the contents of the control information previously sent and which indicates holding transmission power, and for receiving said symbols to which one of said control information is assigned; and control means for performing error correction on said received control information based on a carrier to interference power ratio when the control information is received, if said control information previously received is inconsistent with said control information currently received.

20. A transmitter for transmitting, to a communication partner, control symbols obtained by assigning control information for controlling transmission power to symbols of the phase modulation, so as to control the transmission power of said communication partner, said transmitter comprising:

means for providing a plurality of rectangular subcarriers used to communicate with said communication partner, means for assigning said control symbols to the subcarriers, excluding both ends and a center of a transmission band, from among a plurality of said subcarriers, and means for transmitting subcarriers.

21. A transmitter for transmitting, to a communication partner, control symbols obtained by assigning control information for controlling transmission power to symbols of phase modulation, so as to control the transmission power of said communication partner, said transmitter comprising:

means for using "n" band slots having a plurality of rectangular subcarriers for communication with said communication partner, means for respectively providing "k" subcarriers for transmitting control symbols in the band slots (wherein, $n \geqq k$) from among the "n" band slots, and means for assigning said control symbols one by one to said subcarriers and for transmitting the control symbols.

22. The transmitter according to claim 21, wherein said control information is multiple value data, and a plurality of said subcarriers for transmitting control symbols are used to transmit the control information comprising said multiple value data.

23. The transmitter according to claim 21, wherein said control information is multiple value data having error detection and/or correction bits, and a plurality of said subcarriers for transmitting control symbols are used to transmit the control information comprising said multiple value data.

24. A transmitting and receiving apparatus for receiving, from a communication partner, control symbols obtained by assigning control information for controlling transmission power to symbols of phase modulation, so as to control a transmission power of the apparatus based on the control symbols, said transmitting and receiving apparatus comprising:

means for using "n" band slots having a plurality of rectangular subcarriers for communication, when "k" subcarriers for transmitting control symbols are respectively provided in the band slots (where, $n \geqq k$) from among the "n" band slots, and means for assigning the same control symbols one by one to said subcarriers for transmitting the control symbols, wherein said control symbols are composed in accordance with a carrier to interference power ratio of each band slot to decode said control information from the composed control symbols, and then the transmission power of the apparatus is controlled based on the decoded control information.

25. A transmitting and receiving apparatus for receiving, from a communication partner, control symbols obtained by assigning control information for controlling transmission power to symbols of phase modulation, so as to control a transmission power of the apparatus based on the control information, said transmitting and receiving apparatus comprising:

means for using "n" band slots having a plurality of rectangular subcarriers for communication, when "k" subcarriers for transmitting control symbols are respectively provided in the band slots (where, n≧k) from among the "n" band slots, and means for assigning the same control symbols one by one to said subcarriers for transmitting the control symbols, wherein said control symbols are picked up from the band slot having a most preferable carrier to interference power ratio to decode said control information, and then the transmission power of the apparatus is controlled based on the decoded control information.

* * * * *